(12) United States Patent
Liu (10) Patent No.: US 10,250,441 B2
(45) Date of Patent: Apr. 2, 2019

(54) NETWORK CONFIGURATION ACCESS (71) Applicant: HANGZHOU H3C TECHNOLOGIES CO., LTD., Zhejiang (CN)

(72) Inventor: Mengwen Liu, Zhejiang (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 182 days.

(21) Appl. No.: 15/122,260

(22) PCT Filed: Feb. 12, 2015

(86) PCT No.: PCT/CN2015/072946
§ 371 (c)(1),
(2) Date: Aug. 29, 2016

(87) PCT Pub. No.: WO2015/127866
PCT Pub. Date: Sep. 3, 2015

(65) Prior Publication Data
US 2016/0373300 A1    Dec. 22, 2016

(30) Foreign Application Priority Data

Feb. 28, 2014 (CN) .......................... 2014 1 0070524

(51) Int. Cl.
*G06F 15/177* (2006.01)
*H04L 12/24* (2006.01)

(52) U.S. Cl.
CPC ........ *H04L 41/0823* (2013.01); *H04L 41/022* (2013.01); *H04L 41/0213* (2013.01); *H04L 41/0806* (2013.01)

(58) Field of Classification Search
CPC .................. H04L 41/0823; H04L 41/0213
(Continued)

(56) References Cited

U.S. PATENT DOCUMENTS

2004/0019487 A1    1/2004    Kleindienst et al.
2011/0063972 A1    3/2011    Muley et al.

FOREIGN PATENT DOCUMENTS

CN    101237454 A    8/2008
CN    101795289 A    8/2010
(Continued)

OTHER PUBLICATIONS

International Search Report and Written Opinion, International Application No. PCT/CN2015/072946, dated May 8, 2015, pp. 1-8, SIPO.

(Continued)

*Primary Examiner* — Wing F Chan
*Assistant Examiner* — Joseph R Maniwang
(74) *Attorney, Agent, or Firm* — Hewlett Packard Enterprise Patent Department (57) ABSTRACT

Searching, according to the type information of a network device, for a transport layer protocol supported by the network device in a transport layer architecture of a network configuration protocol (NETCONF) configuration framework and definition information which is to be used to implement a connection to the network device. Establishing a NETCONF session to the network device by using the transport layer protocol and the definition information. During establishment of the NETCONF session, comparing a first NETCONF capability set obtained from the network device with a second NETCONF capability set which is supported by the NMS and is defined in a metadata definition file. Assigning an intersection of the first NETCONF capability set and the second NETCONF capability set as an active capability set. Then, performing a network configuration access to the network device based on the active capability set.

10 Claims, 7 Drawing Sheets

(58) Field of Classification Search
USPC .......................................................... 709/220
See application file for complete search history.

(56) References Cited

FOREIGN PATENT DOCUMENTS

| | | | |
|---|---|---|---|
| CN | 101827078 | A | 9/2010 |
| CN | 102355374 | A | 2/2012 |
| CN | 102427409 | A | 4/2012 |
| CN | 102891768 | A | 1/2013 |
| CN | 102891796 | A | 1/2013 |
| CN | 103281197 | A | 9/2013 |
| CN | 103368781 | A | 10/2013 |
| EP | 2166699 | A1 | 3/2010 |

OTHER PUBLICATIONS

Extended European Search Report, EP Application No. 15754719,1, dated Oct. 24, 2017, pp. 1-14, EPO.
R. Enns et al., "Network Configuraiton Protocol (NETCONF)," Request for Comments: 6241, Jun. 2011, pp. 1-113, Internet Engineering Task Force (IETF).
International Search Report and Written Opinion received for PCT Patent Application No. PCT/CN2015/072952, dated May 12, 2015, 6 pages.
International Preliminary Report on Patentability received for PCT Patent Application No. PCT/CN2015/072952, dated Sep. 15, 2016, 5 pages.
International Preliminary Report on Patentability received for PCT Patent Application No. PCT/CN2015/072946, dated Sep. 15, 2016, 5 pages.

```
⊞ ⊛ NFElement-com.A.imc.netconf.protocol
   ⊞ ⊛ RPContent   com.A.imc.netconf.protocol.content
      ⊞ ⊛ Content   com.A.imc.netconf.protocol.content
   ⊞ ⊛ RPMessage   com.A.imc.netconf.protocol.message
      ⊞ ⊛ Message   com.A.imc.netconf.protocol.message
         ⊛ Hello   com.A.imc.netconf.protocol.message.hello
         ⊛ Query   com.A.imc.netconf.protocol.message.query
         ⊛ Reply   com.A.imc.netconf.protocol.message.reply
   ⊞ ⊛ RPOperation   com.A.imc.netconf.protocol.operation
      ⊛ Operation   com.A.imc.netconf.protocol.operation
   ⊞ ⊛ RPOperationParameter   com.A.imc.netconf.protocol.operation.parameter
      ⊞ ⊛ ConfigurationDatastore   com.A.imc.netconf.protocol.operation.parameter.common
         ⊛ ConfigurationDatastoreRunning   com.A.imc.netconf.protocol.operation.parameter.common
      ⊛ Filter   com.A.imc.netconf.protocol.operation.parameter.common
      ⊛ Source   com.A.imc.netconf.protocol.operation.parameter.common
      ⊛ Target   com.A.imc.netconf.protocol.operation.parameter.common
      ⊛ Top   com.A.imc.netconf.protocol.operation.parameter.common
```

NETWORK CONFIGURATION ACCESS

BACKGROUND

Network Configuration Protocol (NETCONF) is a network management protocol based on the Extensible Markup Language (XML). It may provide a convenient way to configure and manage a network device. The NETCONF allows a network device to provide complete and standardized programming interfaces to the external. The users or third-party application developers may configure parameters, and retrieve values or statistics for a network device through the interfaces.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

The interaction communication of the NETCONF configuration and information is based on XML. The NETCONF is easier to parse the data and information with respect to the command line, the SNMP (Simple Network Management Protocol, SNMP) and other interactive means of communication. The transport layer of the NETCONF is independent to the NETCONF and may support multiple communication connections, such as, TELNET, SSH (Secure Shell, Secure Shell), CONSOLE, SOAP (Simple Object Access Protocol, Simple Object Access Protocol). BEEP (Blocks Extensible Exchange Protocol, and blocks Extensible Exchange protocol), etc.

Figure 1:
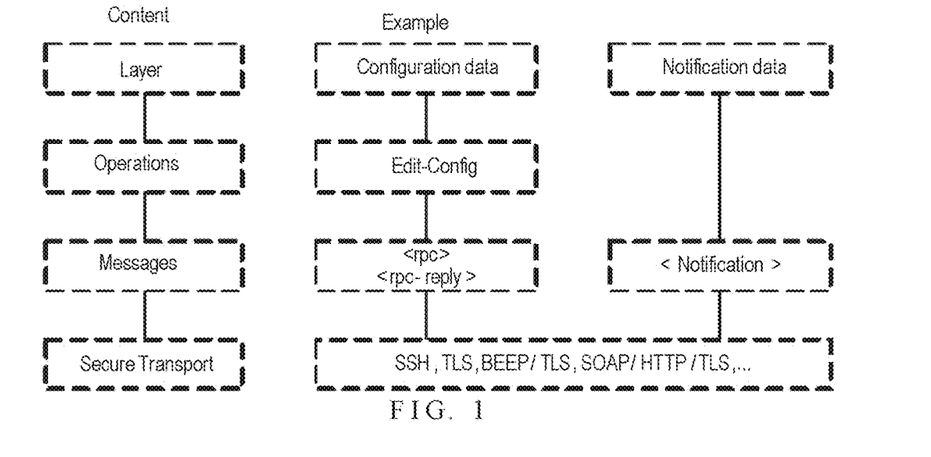
FIG. 1 is a schematic diagram illustrating an example Network Configuration Protocol (NETCONF) hierarchy.

FIG. 1 is a schematic diagram illustrating a Network Configuration Protocol (NETCONF) hierarchy.

AS shown in FIG. 1, the first layer is the secure transport layer of the NETCONF. The protocols of the transport layer are independent to the protocols of the NETCONF. The transport layer may provide a corresponding session carrier between the network device and a network management system (NMS).

The protocols supported by the transport layer of the NETCONF include, but are not limited to, the following types:

1) SSH;
2) SOAP;
3) BEEP, wherein the transport layer may use different types of transport layer protocols to establish the NETCONF session, and the configuration parameters of different transport layer protocols may be different. Even with the same transport layer protocol, the configuration parameters may be in a great difference to implement the NETCONF connection to the network devices which are from different vendors.

In an example, a NETCONF session is established by using the telnet transport protocol for the network device of the company A. An administrator needs to use the command [xml] to enter into the xml view of the network device of company A. Another NETCONF session is established by using the SSH transport protocol for the network device of the company B, and the administrator need to use a SSH subsystem [netconf] to log in the network device of company B.

Another more NETCONF session is established by using the SOAP transport protocol for the network device of the company C, and the administrator needs to use the path [/soap/netconf] in the URL to issue HTTP requests of the network device of company C.

In addition, the transport layer is further responsible for the maintenance of the session management model. The requirement for the network device in RFC specification may support at least one NETCONF session, but it may often require a lot of support for multiple NETCONF sessions.

The network device of different vendors may typically implement the NETCONF session management modes in different ways. For example, the network devices of the company A may simultaneously establish at most five NETCONF sessions. After the number of users exceeds the upper limit, the login of the other users may be failed. However, in the example, the number of the NETCONF sessions and management model of the other vendor's network device may not be exactly the same with that of the company A. It may lead to the failure for unifying configuration parameters.

The second layer is the Messages layer of the NETCONF. The Messages layer provides a simple, transport-protocol-independent framing mechanism for encoding RPCs and notifications.

The Messages layer may use an RPC-based communication model. The Messages layer may use <rpc> and <rpc-reply> elements to provide transport-protocol-independent framing of the NETCONF requests and responses. For example, the Messages layer may use <rpc> element to represent a NETCONF request from a client to a server. The Messages layer may use <rpc-reply> element to represent a NETCONF response from a server to a client The Messages layer may use <ok> element which is sent in <rpc-reply> message to represent no errors or warnings occurred during the processing of an <rpc> request. The Messages layer may use <rpc-error> to represent an error occurred during the processing of an <rpc> request.

The third layer is the Operations layer of the NETCONF. The Operations layer defines a set of base protocol operations invoked by the RPC methods with XML-encoded parameters. The base protocol operations may be formed the basic function of the NETCONF.

Specifically, the NETCONF defines nine base protocol operations. The main operations may include <get>, <get-config>, <edit-config>, <lock>, <unlock>, <close-session>, <kill-session>, and other operations.

According to the function and use semantic, the NETCONF may further divide the above operations into capability sets for managing. In the process of establishing the NETCONF connection, the client end may send the <hello> element to the network management system (NMS) and complete the exchange of the capability sets, then the network device can establish a session and handle subsequent requests sent by the client end.

In the RFC specification, the major capability set may be defined as follows:
Base: The basic capability set.
Writable-running: The capability set for running configuration changes.
Candidate-configuration: The capability set for alternative configurations.
Confirmed-commit: The capability set for confirming submission.
Rollback-on-error: The capability set for rolling back error.

Table 1 may show an example of the implementation supports of the NETCONF capability set of different vendors. As shown, a full support is represented by "++", a partially support is represented by "+", and un-support is represented by "-"

TABLE 1

The implementation support of the NETCONF capability set of different vendors

| Name of capability set | Vendor A | Vendor B | Vendor C |
| --- | --- | --- | --- |
| Base | ++ | ++ | ++ |
| writable-running | ++ | - | ++ |
| Candidate | ++ | ++ | ++ |
| confirmed-commit | ++ | ++ | - |
| rollback-on-error | ++ | ++ | - |
| Validate | ++ | ++ | + |
| Startup | ++ | - | ++ |
| url | ++ | ++ | - |
| Xpath | ++ | - | - |
| Notification | + | - | - |

As shown in table 1, the implementation support of the NETCONF capability set of different vendors may vary widely. Different vendors may also define a series of their own proprietary facilities to support the proprietary extension capability sets for providing additional operating functions of the NETCONF configuration.

The fourth layer is the Content layer of the NETCONF. The Content layer may be the collection of managed objects which may be the configuration data, status data, and statistical information managed by the device. There is no unified specification for reading/writing data of the Content layer. To read/write data of the Content layer, an administrator may refer to the XSD definitions of product implementation of each vendor.

By the analysis of the first, third, and fourth layer of NETCONF, it is known that the support and the use of the transport layer protocol of the network devices of different vendors, the implementation of the operation layer and the extended operation primitives, and the representation model of the information data of the Content layer are great different. When an administrator uses a network device of a vendor to perform the interaction of the NETCONF to a network device of another vendor, the administrator may need to know and use the above information and modes.

Accordingly, when the NETCONF configuration is performed by using the NETCONF SOAP client end or the Telnet/SSH client end, etc., the administrator may build the corresponding transmission channel based on the transport layer protocol, establish and maintain the corresponding session, write and parse the corresponding <rpc> and <rpc-reply> protocol regional content, and understand and fill the corresponding data of operations and the Content layer. When a network device of a vendor performs the interaction of the NETCONF to a network device of another vendor, the administrator may also know and apply the different configuration policies and the configuration content. It is a heavy burden for the administrator.

Therefore, how to provide the convenient NETCONF session, operation, and convenient management and maintenance of content has become an important issue when the NETCONF is widely used in network management.

The present disclosure provides a method of the NETCONF configuration access.

Figure 2:
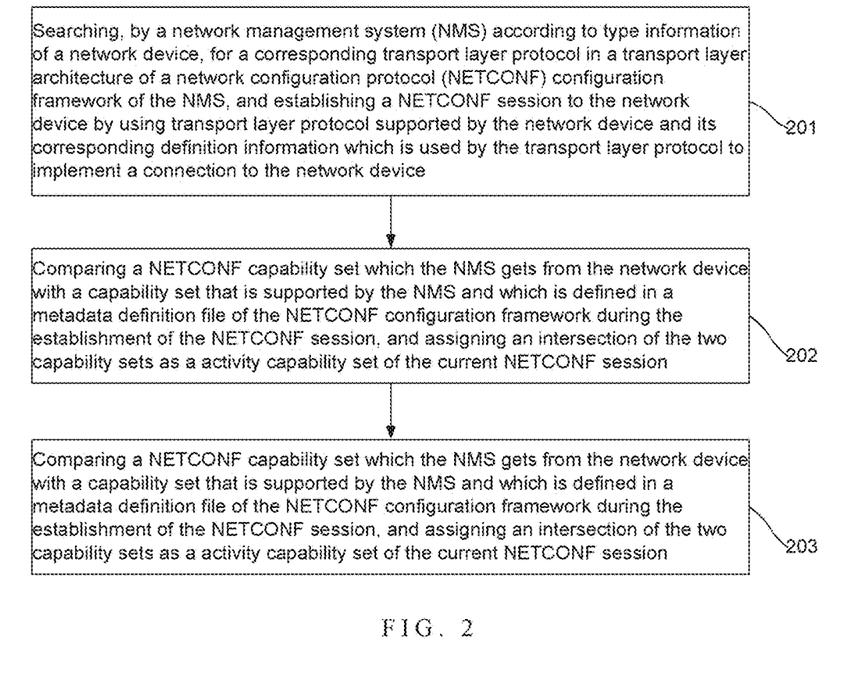
FIG. 2 is a flowchart of network configuration access, according to an example of the present disclosure.

FIG. 2 is a flowchart of network configuration access according to an example of the present disclosure. As shown, in block 201, according to the type information of a network device, a network management system (NMS) may search for a corresponding transport layer protocol which is supported by the network device in a transport layer architecture of a network configuration protocol (NETCONF) configuration framework of the NMS and the definition information which is used by the transport layer protocol to implement a connection to the network device. The NMS may establish a NETCONF session to the network device by using the found transport layer protocol supported by the network device and its corresponding definition information which is used by the transport layer protocol to implement a connection to the network device.

In block 202, during the establishment of the NETCONF session, the NMS may compare a first NETCONF capability set which is obtained from the network device with a second NETCONF capability set which is supported by the NMS. For example the second NETCONF capability set may be defined in a metadata definition file of the NETCONF configuration framework. The NMS may assign an intersection of the first NETCONF capability set and the second NETCONF capability set as an active capability set of the current NETCONF session. An "intersection" of the capability sets means the capabilities which are present in both the first NETCONF capability set and the second NETCONF capability set.

In block 203, the NMS may perform a network configuration access to the network device based on the active capability set of the current NETCONF session.

In some examples, the NMS may carry out some further actions in addition to the above. Before performing block 201, according to a metadata definition specification of the pre-defined NETCONF configuration framework, the NMS may define the type, the capability set, and the operation information of the network device in the metadata definition file of the NETCONF configuration framework.

The NMS may define the operation element and the operation parameter element of the network device according to a protocol abstract architecture of the pre-defined NETCONF configuration framework, wherein the protocol abstract architecture defines the corresponding interface and the implementation of a NETCONF protocol layer hierarchy in the NETCONF configuration framework.

According to the transport layer architecture of the pre-defined NETCONF configuration frame, the NMS may define the transport layer protocol and the connection to the network device in which the connection adopts the corresponding transport layer protocol.

Before performing block 203, according to operation information of the network configuration access, the NMS may search a protocol abstract architecture of the NETCONF configuration framework to find an interface. The operation information may be an operation name of the network configuration access. Next, the NMS may create an operation instance in the interface according to the active capability set of the NETCONF session and a combination of operation information of the network device. The operation information is defined in the metadata definition file of the NETCONF configuration framework. The NMS may encapsulate the operation instance to a query instance. The NMS may set up attributes of the operation instance of the query instance. The NMS may generate the NETCONF configuration contents according to the query instance. Finally, the NMS may perform a configuration access to the network device by using the establishing NETCONF session.

Figure 3:
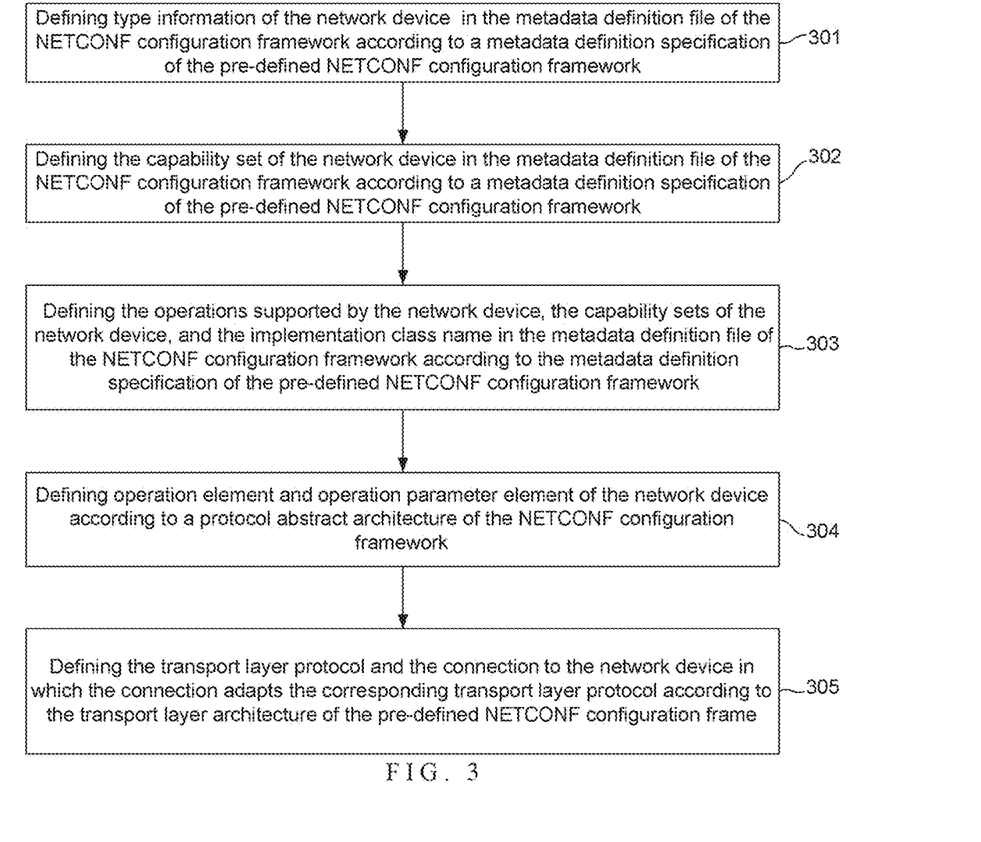
FIG. 3 is a flowchart of implementation of network configuration access, according to another example of the present disclosure.

FIG. 3 is a flowchart of implementation of network configuration access, which may be performed by a NMS, according to another example of the present disclosure.

In block 301, according to the metadata definition specification of the pre-defined NETCONF configuration framework, the NMS may define the type information of the network device in the metadata definition file of the NETCONF configuration framework.

In this block, the network device may be the device which supports the NETCONF. In the example of the present disclosure, the type information of the network device may typically be the vendor information or model information.

The metadata definition specification of the NETCONF configuration framework may define the vendor, the capability set, the operation, and so on, that implement the NETCONF configuration framework. In the present disclosure, it may use the XML format to pre-define the metadata definition specification of the NETCONF configuration framework.

In block 302, according to the metadata definition specification of the pre-defined NETCONF configuration framework, the NMS may define the capability set of the network device in the metadata definition file of the NETCONF configuration framework.

In block 303, according to the metadata definition specification of the pre-defined NETCONF configuration framework, the NMS may define the operations supported by the network device, the capability sets of the network device, and the implementation class name in the metadata definition file of the NETCONF configuration framework, wherein the capability sets and the implementation class name are related to the operations.

In implementation, the format of the metadata definition file of the NETCONF configuration framework in blocks 301-303 may adopt any format, such as, the XML format. The following examples may use the XML format.

1) Vendor Information

In this field, it may define the vendor that implements the NETCONF configuration framework. For example, the vendor that implements the capability set defined in the RFC may uniformly be "Common" and the vendor that implements its own capability set may be its vendor name. For example:

```
<vendors>
    <vendor>
        <vendorName>Common</vendorName>
    </vendor>
    <vendor>
        <vendorName>A</vendorName>
    </vendor>
    <vendor>
        <vendorName>B</vendorName>
    </vendor>
    <vendor>
        <vendorName>C</vendorName>
    </vendor>
    <vendor>
        <vendorName>D</vendorName>
    </vendor>
</vendors>
```

Attribute Description:

vendorName: It is the name of vendor. The vendorName is unique.

2) Capability Set Information

In this field, it may define the capability set which is supported by the NETCONF configuration framework. It defines the vendor that implements each capability set.

For example:

```
<capabilities>
    <capability>
        <capabilityId>urn:ietf:params:netconf:base:1.0</capabilityId>
        <capabilityXmlns>urn:ietf:params:xml:ns:netconf:base:1.0</capabilityXmlns>
        <capabilityDesc>netconf.capability.base.desc</capabilityDesc>
        <capabilityVendor>Common</capabilityVendor>
        <capabilitySupported>true</capabilitySupported>
    </capability>
    <capability>
        <capabilityId> urn:ietf:params:netconf:capability:A-netconf-ext:1.0</capabilityId>
        <capabilityXmlns>urn:ietf:params:xml:ns:netconf:capability:A-netconf-ext:1.0</capabilityXmlns>
        <capabilityVendor>A</capabilityVendor>
```

```
    <capabilitySupported>true</capabilitySupported>
  </capability>
</capabilities>
```

Attribute Description:

capabilityId: It is the identifier of the capability set. The capabilityId is unique.

capabilityXmlns: It is the XML namespace of the capability set.

capabilityDesc: It is the description of the capability set. The capabilityDesc is optional.

capabilityVendor: It is the name of the vendor who implements the capability set.

capabilitySupported: it is the capability set supported by the NETCONF configuration framework. The default is false.

3) The Operation Information

In this field, it may define the operations, the capability sets, and the implementation class name in the NETCONF configuration framework. For example:

```
<operations>
    <operation>
        <operationId>commonGet</operationId>
        <operationName>get</operationName>
        <operationCapabilities>
            <capabilityId>urn:ietf:params:netconf:base:1.0</capabilityId>
            <capabilityId>urn:ietf:params:netconf:base:1.1</capabilityId>
        </operationCapabilities>
<operationClass>com.A.imc.netconf.protocol.operation.common.Get</operationClass>
    </operation>
    <operation>
        <operationId>AMockOperation</operationId>
        <operationName>A-mock-operation</operationName>
        <operationCapabilities>
                <capabilityId>urn:ietf:params:netconf:capability:A-netconf-ext: 1.0</capabilityId>
        </operationCapabilities>
        <operationClass>com.A.imc.netconf.protocol.operation.A.AMockOperation</operationClass>
    </operation>
</operations>
```

Attribute Description:

operationId: It is the operation identifier. The operationId is unique.

operationName: It is the operation name. The operationName is the tag name of the operation operationCapabilities: It is the capability set that supports the operation. The operationCapabilities may have a plurality of the capabilityId.

operationClass: It is the fully qualified class name of the operation implement class.

In block 304, The NMS may define the operation element and the operation parameter element of the network device according to the protocol abstract architecture of the NETCONF configuration framework.

As shown in FIG. 1, the protocol abstract architecture may define the corresponding interface and the implementation of a NETCONF protocol layer hierarchy in the NETCONF configuration framework. The operations of the NETCONF protocol layer hierarchy defined in the RFC or the operations of extended implementation of a specific vendor may extend by instantiating or inheriting from the corresponding interfaces of the NETCONF configuration framework.

Figure 4:
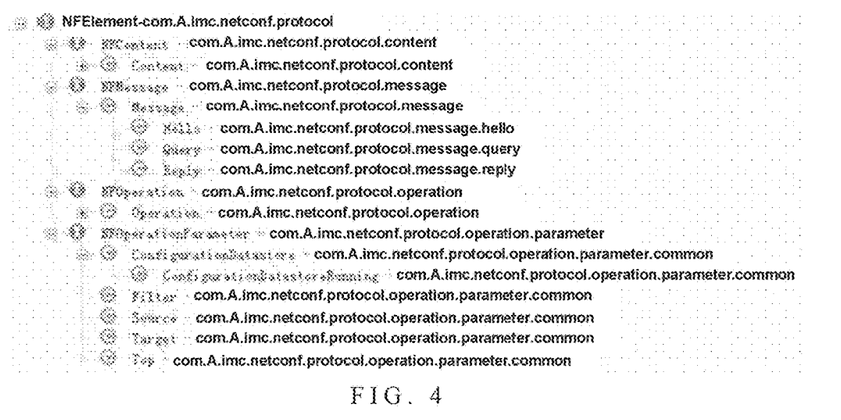
FIG. 4 is an example of using Java language to define and implement the protocol abstract architecture of the NETCONF configuration framework, according to an example of the present disclosure.

It may use any object-oriented programming language to define and implement the protocol abstract architecture of the NETCONF configuration framework. FIG. 4 is an example of using Java language to define and implement the protocol abstract architecture of the NETCONF configuration framework according to an example of the present disclosure. The meaning of the protocol abstract interface are as follow:

NFElement interface: The NFElement interface is the implementation of interface of the protocol element of the NETCONF configuration framework.

NFMessage interface: The NFMessage interface is the encapsulated interface of the NETCONF configuration framework corresponding to the protocol element in the level 2 Messages layer of the RFC. The base class of the NFMessage interface is the Message class.

NFOperation interface: The NFOperation interface is the encapsulated interface of the NETCONF configuration framework corresponding to the protocol element in the level 3 Operations layer of the RFC. The base class of the NFOperation interface is the Operation class.

NFOperationParameter interface: The NFOperationParameter interface is the encapsulated interface of the NETCONF configuration framework corresponding to the protocol operation parameter element in the level 3 Operations layer of the RFC.

NFContent interface: The NFContent interface is the encapsulated interface of the NETCONF configuration framework corresponding to the protocol element in the level 4 Content layer of the RFC. The base class of the NFContent interface is the Content class.

As shown in FIG. 4, "A" represents the vender name.

In block 305, the NMS may define the transport layer protocol supported by the network device and the connection to the network device according to the transport layer architecture of the pre-defined NETCONF configuration frame. The connection may adapt the corresponding transport layer protocol supported by the network device.

Here, the definition of the connection to the network device may further include the definition of the configuration parameters for each transport layer protocol, the definition of the usage patterns of the configuration parameters, and the definition of the adapter of the network device. The transport layer protocol uses the configuration parameters to establish the connection to a network device. The configuration parameters may be the access address of the network device, port number, user name and password, and so on.

FIG. 3 is a flowchart of initial implementation of network configuration access according to an example of the present disclosure. In a practical implementation, when there is a network device with new type joined the NMS, or when a NETCONF capability set supported by a specific type network device is extended, the NETCONF configuration frame may expend.

Figure 5:
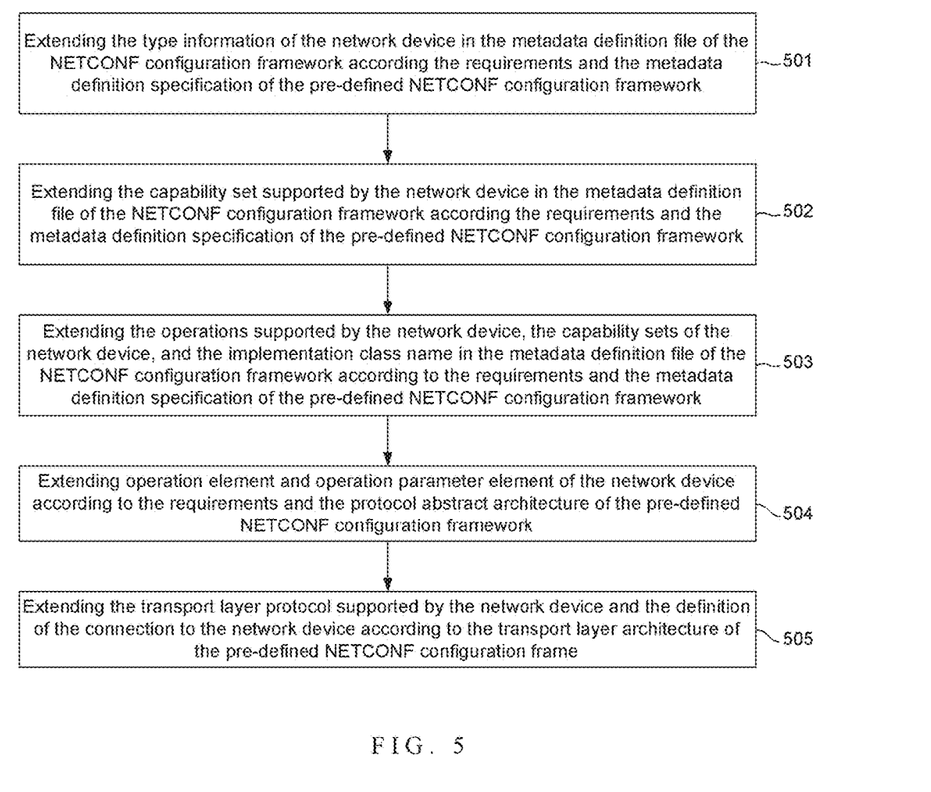
FIG. 5 is a flowchart of the extension of the NETCONF configuration framework, according to an example of the present disclosure.

FIG. 5 is a flowchart of the extension of the NETCONF configuration framework, according to an example of the present disclosure;

As shown, in block 501, the NMS may extend the type information of the network device in the metadata definition file of the NETCONF configuration framework according the requirements and the metadata definition specification of the pre-defined NETCONF configuration framework.

Block 501 may perform when a network device with a new model or a network device of new vendor adds in the NMS.

In block 502, the NMS may extend the capability set supported by the network device in the metadata definition file of the NETCONF configuration framework according the requirements and the metadata definition specification of the pre-defined NETCONF configuration framework.

In an example, when the capability sets of a network device in which the capability sets have been added to the NMS are updated, the NMS may update the corresponding capability sets of the network device.

In block 503, the NMS may extend the operations supported by the network device, the capability sets of the network device, and the implementation class name in the metadata definition file of the NETCONF configuration framework according to the requirements and the metadata definition specification of the pre-defined NETCONF configuration framework. The capability sets and the implementation class name are related to the operations.

In an example, when the operations supported by a capability set of a network device in which the operations have been added to the NMS are updated, the NMS may add the new operations, the capability sets corresponding to the new operations, and the implementation class name of the new operations.

In block 504, the NMS may extend the operation element and the operation parameter element of the network device according to the requirements and the protocol abstract architecture of the pre-defined NETCONF configuration framework.

In an example, when the operation supported by a capability set of a network device in which the operation has been added to the NMS is updated, the NMS may add the corresponding operation element and operation parameter element in the protocol abstract architecture of the NETCONF configuration framework.

In block 505, the NMS may extend the transport layer protocol supported by the network device and the definition of the connection to the network device according to the transport layer architecture of the pre-defined NETCONF configuration frame, wherein the connection uses the corresponding transport layer protocol.

In an example, when the transport layer protocol supported by a network device in which the transport layer protocol has been added to the NMS is updated, or the supported connection implementation of the transport layer protocol is updated, the transport layer protocol or the definition of the connection implementation in the transport layer protocol may be updated, wherein the transport layer protocol is in the transport layer architecture of the NETCONF configuration framework.

Figure 6:
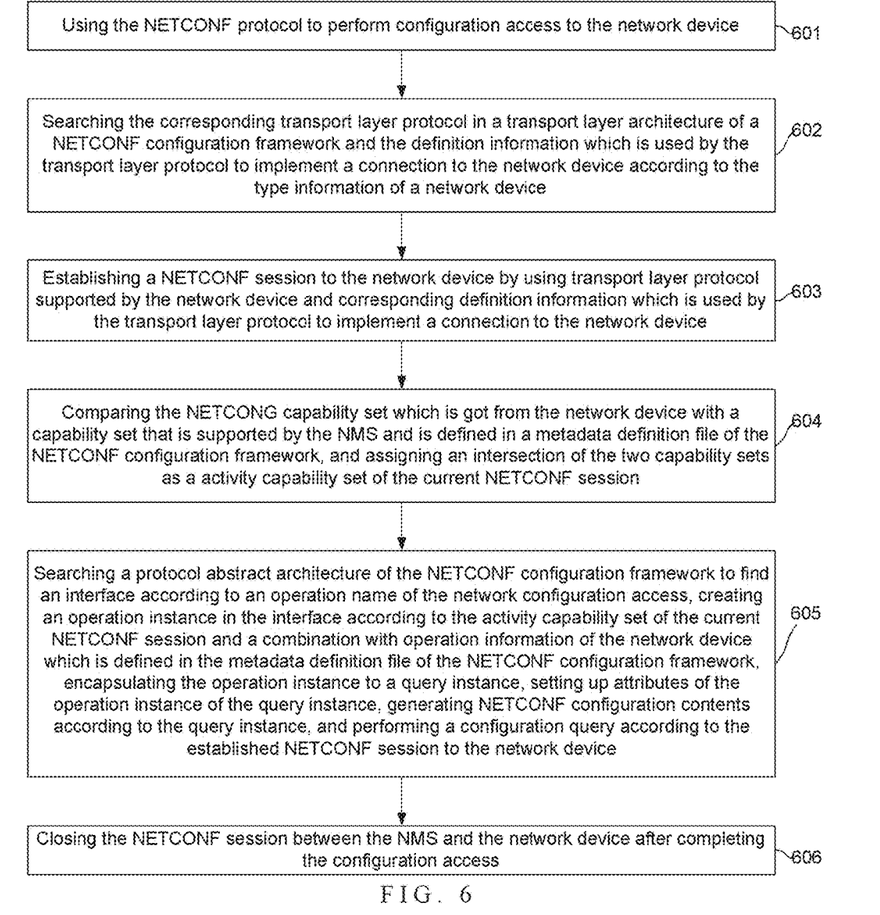
FIG. 6 is a flowchart of using the NETCONF for configuration access to network device, according to an example of the present disclosure.

FIG. 6 is a flowchart of using the NETCONF protocol for configuration access to network device, according to an example of the present disclosure.

In block 601, the NMS may use the NETCONF protocol to perform configuration access to the network device.

The trigger of the NETCONF network configuration access is the user who uses the NETCONF, such as the administrator. When the user of the NETCONF wants to access to the network device, a NETCONF configuration access request of the network device may be entered to the NMS by the user.

The NETCONF configuration access may directly send the configurations to the network device. Or, according to the management requirements, the NETCONF configuration access may get the configurations from the network device after the completion of configuration download of the network device. For example, when the NMS manages the network device, the NMS may get the interface configuration, such as the interface index or the interface description, the startup configuration, or the running configuration.

In block 602, according to the type information of a network device, the NMS may search the corresponding transport layer protocol which is supported by the network device in the transport layer architecture of the NETCONF configuration framework and the definition information which is used by the transport layer protocol to implement a connection to the network device.

In block 603, the NMS may establish a NETCONF session to the network device by using the transport layer protocol supported by the network device and the corresponding definition information which is used by the transport layer protocol to implement a connection to the network device.

In block 604, the network device may send its NETCONF capability set to the NMS during the establishment of the NETCONF session. The NMS may compare a first NETCONF capability set which is obtained from the network device with a second NETCONF capability set that is supported by the NMS and is defined in a metadata definition file of the NETCONF configuration framework. The NMS may assign an intersection of the two capability sets as an active capability set of the NETCONF session.

In block 605, the NMS may search the protocol abstract architecture of the NETCONF configuration framework to find an interface according to an operation name of the network configuration access. The NMS may create an operation instance in the interface according to the active capability set of the NETCONF session and a combination of operation information of the network device in which the operation information is defined in the metadata definition file of the NETCONF configuration framework. The NMS may encapsulate the operation instance to a query instance. The NMS may set up attributes of the operation instance of the query instance. The NMS may generate the NETCONF configuration contents according to the query instance. The NMS may perform a configuration access to the network device by using the establishing NETCONF session.

In an example, when the NMS performs the configuration access, the NMS may search, based on the operation name (i.e. "get") of the configuration access, the metadata definition file of the NETCONF configuration framework to find the corresponding class, i.e. getClass. Then, the NMS may search the protocol abstract architecture of the NETCONF configuration framework to find an interface corresponding to the getClass. The NMS may create an operation instance in the interface according to the active capability set of the NETCONF session, such as the network device vendor information and the supported NETCONF protocol version number, etc., and a combination of operation information of the network device in which the operation information is defined in the metadata definition file of the NETCONF configuration framework. The NMS may encapsulate the operation instance to a query instance. The NMS may set up attributes of the operation instance of the query instance. The NMS may generate the NETCONF configuration contents according to the query instance. The NMS may perform a configuration access to the network device by using the establishing the NETCONF session.

In block 606, the NMS may close the NETCONF session between the NMS and the network device after completing the configuration access.

In a practical application, the network device which is accessed by the NETCONF user may be a remote device. In order to make the remote access process transparent to the NETCONF user, the NMS may save a mapping between the identification information of the network device and the identification information of the NMS in a local area network, in which the NMS is located in the local area network. When the user of the NETCONF protocol issues a NETCONF configuration access request of the network device and sends to the NMS, the NMS may first search the identification information of the NMS in the local area network according to the identification information of the network device. If the found identification information of the NMS points to itself, the NMS performs the processes of blocks 601 to 606. Otherwise, the NMS forwards the NETCONF configuration access request to other NMS in which the NMS and the network device are located in the same local area network for performing the processes of blocks 601 to 606.

Based on the aforementioned examples, it is known that the present disclosure has the following advantages:

1) Low complexity: The users or third-party developers may perform the configuration access and the extension of operation information by using the interface of the protocol abstract architecture of the NETCONF configuration framework. It may pay no attention to the locations of the users or third-party developers, the creation mode of the session and the maintenance strategies, or the use of different transport protocols and other details of the differences. Thus, it may dramatically reduce the complexity of use.
2) High degree of scalability: The present disclosure may provide a framework that may support the extension of the NETCONF capability set and the operations. It may perform the extension of the vendor, the capability set, and the operations of metadata definition of the NETCONF configuration framework. It may perform the abstract extension of the implementation protocol of the operation element and the operation parameter element.
3) Establishment of a consistent channel mode: A variety of transport protocols channel, such as SOAP (HTTP/HTTPS), SSH, BEEP, etc., may establish by adopting an unified strategy. The third-party developers may implement other transport protocol adapter according to the extension of the transport layer interface of the NETCONF configuration framework.
4) Transparency of the session management mechanism: The NETCONF configuration framework may establish and maintain the NETCONF session. Users may focus on operations and other protocol configuration information without concerning the interaction and implementation details of the session and the transport layer.

Figure 7:
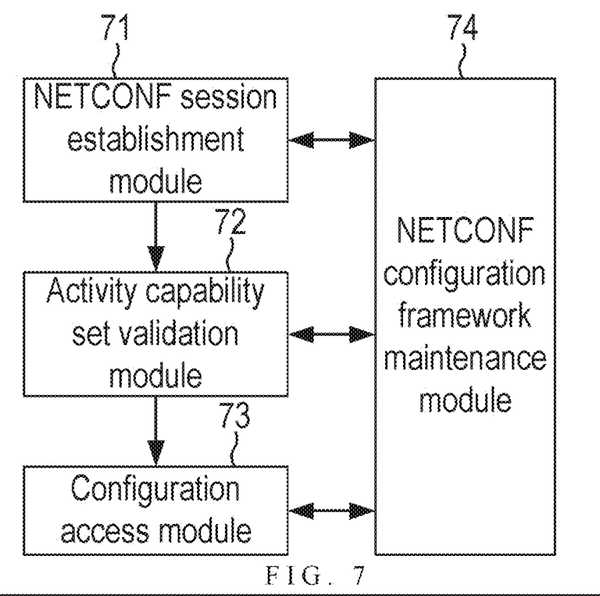
FIG. 7 is a schematic construction diagram of a network configuration access logic, according to an example of the present disclosure.

Corresponding to the aforementioned methods, the present disclosure also provides a network configuration access logic shown in FIG. 7. FIG. 7 is a schematic construction diagram of a network configuration access logic according to an example of the present disclosure. According to the functionality, the network configuration access logic may include a NETCONF session establishment module 71, an active capability set validation module 72, a configuration access module 73, and a NETCONF configuration framework maintenance module 74.

According to the type information of a network device, the NETCONF session establishment module 71 may search the corresponding transport layer protocol supported by the network device in the transport layer architecture of the network configuration protocol (NETCONF) configuration framework and the definition information which is used by the transport layer protocol to implement a connection to the network device. Then, the NETCONF session establishment module 71 may establish a NETCONF session to the network device by using the transport layer protocol supported by the network device and the corresponding definition information which is used by the transport layer protocol to implement a connection to the network device.

During the establishment of the NETCONF session, the active capability set validation module 72 may compare a first NETCONF capability set which is obtained from the network device with a second NETCONF capability set which is supported by the network management system (NMS) and is defined in a metadata definition file of the NETCONF configuration framework. The active capability set validation module 72 may assign an intersection of the two capability sets as an active capability set of the NETCONF session.

The configuration access module 73 may perform a network configuration access to the network device based on the active capability set of the NETCONF session.

When the configuration access module 73 uses the active capability set of the NETCONF session to perform the network configuration access to the network device, the configuration access module 73 may search the protocol abstract architecture of the NETCONF configuration framework to find an interface according to an operation name of the network configuration access. The configuration access module 73 may create an operation instance in the interface according to the active capability set of the NETCONF session and a combination of operation information of the network device in which the operation information is defined in the metadata definition file of the NETCONF configuration framework. The configuration access module 73 may encapsulate the operation instance to a query instance. The configuration access module 73 may set up attributes of the operation instance of the query instance. The configuration access module 73 may generate the NETCONF configuration contents according to the query instance. The configuration access module 73 may perform a configuration access to the network device by using the establishing NETCONF session.

According to a metadata definition specification of the pre-defined NETCONF configuration framework, the NETCONF configuration framework maintenance module 74 may define the type, the capability set, and the operation information of the network device in the metadata definition file of the NETCONF configuration framework.

According to the protocol abstract architecture of the NETCONF configuration framework, the NETCONF configuration framework maintenance module 74 may define the operation element and the operation parameter element of the network device, wherein the protocol abstract architecture defines the corresponding interface and the implementation of a NETCONF protocol layer hierarchy in the NETCONF configuration framework.

According to the transport layer architecture of the pre-defined NETCONF configuration frame, the NETCONF configuration framework maintenance module 74 may define the transport layer protocol supported by the network device and the connection to the network device in which the connection adopts the corresponding transport layer protocol.

Further, according to the metadata definition specification of the pre-defined NETCONF configuration framework, the NETCONF configuration framework maintenance module 74 may extend the type information, the capability set, and the operation information supported by the network device in the metadata definition file. According to the protocol abstract architecture of the pre-defined NETCONF configuration framework, the NETCONF configuration framework maintenance module 74 may extend the operation element and the operation parameter element of the network device. According to the transport layer architecture of the pre-defined NETCONF configuration frame, the NETCONF configuration framework maintenance module 74 may extend the transport layer protocol supported by the network device and the definition of the connection to the network device in which the connection use the corresponding transport layer protocol.

Further, the configuration access module 73 may save a mapping between the network device and the NMS in a local area network in which the NMS is located in the local area network. The configuration access module 73 uses the NETCONF configuration frame, which is maintained by the NETCONF configuration framework maintenance module 74, to perform the configuration access to the network device. The configuration access may further include: receiving of a network configuration access request of the network device from a user, such as the administrator, determining whether the NMS is the local network management system of the network device based on the mapping, if yes, directly performing the network configuration access to the network device, otherwise, forwarding the network configuration access to the local network management system of the network device for performing the network configuration access to the network device.

In the example of the present disclosure, the aforementioned modules may be integrated in an unit, may be separated deployed, may be combined into an unit, and may be further split into a plurality of sub-units.

In the example of the present disclosure, the aforementioned modules may implement by software modules (e.g., instructions which are executed by a processor and stored in a non-transitory computer readable storage medium), or may implement by hardware (e.g., Application Specific Integrated Circuit (ASIC) processors), or may realize by a combination of software and hardware. The example of the present disclosure is not particularly limited.

Figure 8:
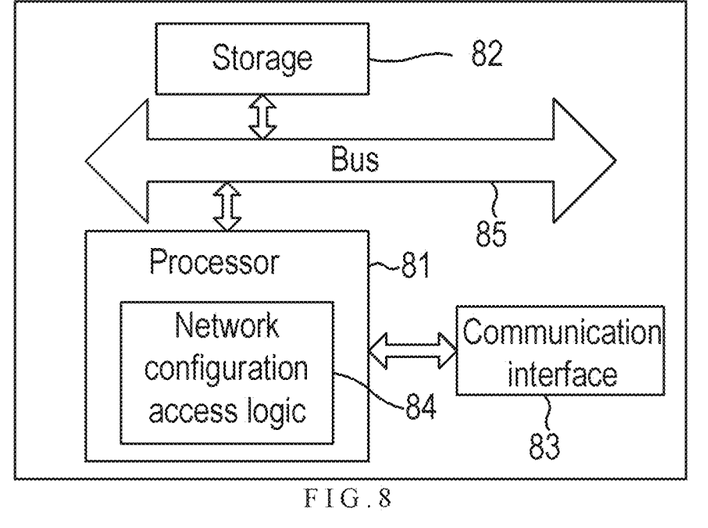
FIG. 8 is a block diagram illustrating part of a network configuration access device, according to an example of the present disclosure.

FIG. 8 is an example of a block diagram illustrating part of a server storing network configuration access logic, according to an example of the present disclosure. The server may act as a NMS that performs network configuration access. As shown, the network configuration access logic is implemented by software. The server may typically include a processor 81 and a storage 82, wherein the storage 82 is accessible by the processor 81 through the internal bus 85. In addition, the network management server may also include other hardware, such as the communication interface 83 for receiving or sending data. The storage 82 may be a volatile or non-volatile memory or storage media including by way of example semiconductor memory devices, e.g., EPROM, EEPROM, DRAM and flash memory devices; magnetic disks, e.g., internal hard disks or removable disks; magneto optical disks; and CD ROM and DVD-ROM disks.

As shown in FIG. 8, the network configuration access logic 84 may be the machine readable instructions which are stored in the storage 82. The processor 81 may read the machine readable instructions and execute machine readable instructions. According to the machine readable instructions and the type information of a network device, the processor 81 may search the corresponding transport layer protocol supported by the network device in the transport layer architecture of the network configuration protocol (NETCONF) configuration framework and the definition information which is used by the transport layer protocol to implement a connection to the network device. The processor 81 may establish a NETCONF session to the network device by using transport layer protocol supported by the network device and corresponding definition information which is used by the transport layer protocol to implement a connection to the network device.

During the establishment of the NETCONF session, the processor 81 may compare a first NETCONF capability set which is obtained from the network device with a second NETCONF capability set which is supported by a network management system (NMS) and is defined in a metadata definition file of the NETCONF configuration framework. The processor 81 may assign an intersection of the two capability sets as an active capability set of the NETCONF session.

The processor 81 may perform a network configuration access to the network device based on the active capability set of the NETCONF session.

Further, according to the active capability set of the NETCONF session, when the processor 81 reads the instructions of the network configuration access logic 84 which are stored in the storage 82 to perform a network configuration access to the network device, the processor 81 may search, according to an operation name of the network configuration access, a protocol abstract architecture of the NETCONF configuration framework to find an interface. The processor 81 may create an operation instance in the interface according to the active capability set of the NETCONF session and a combination of operation information of the network device in which the operation information is defined in the metadata definition file of the NETCONF configuration framework. The processor 81 may encapsulate the operation instance to a query instance. The processor 81 may set up attributes of the operation instance of the query instance. The processor 81 may generate the NETCONF configuration contents according to the query instance. The processor 81 may perform a configuration access to the network device by using the establishing NETCONF session.

Further, the processor 81 reads the instructions of the network configuration access logic 84 which are stored in the storage 82 to define the type, the capability set, and the operation information of the network device according to a metadata definition specification of the pre-defined NETCONF configuration framework in the metadata definition file of the NETCONF configuration framework. The processor 81 may define the operation element and the operation parameter element of the network device according to a protocol abstract architecture of the NETCONF configuration framework, wherein the protocol abstract architecture defines corresponding interface and implementation of a NETCONF protocol layer hierarchy in the NETCONF configuration framework. The processor 81 may define the transport layer protocol supported by the network device and the connection to the network device in which is adapted by the corresponding transport layer protocol according to the transport layer architecture of the pre-defined NETCONF configuration frame.

Further, the processor 81 reads the instructions of the network configuration access logic 84 which are stored in the storage 82 to extend the type information, the capability set, and the operation information supported by the network device in the metadata definition file according to a metadata definition specification of the pre-defined NETCONF configuration framework. The processor 81 may extend the operation element and the operation parameter element of the network device according to the protocol abstract architecture of the pre-defined NETCONF configuration framework. Or, the processor 81 may extend, according to the transport layer architecture of the pre-defined NETCONF configuration frame, the transport layer protocol supported by the network device and the definition of the connection to the network device in which the connection uses the corresponding transport layer protocol.

Further, the processor 81 reads the instructions of the network configuration access logic 84 which are stored in the storage 82 to save a mapping between the network device and the NMS of a local area network in which the NMS is located in the local area network.

The configuration access, which is performed by the processor 81 based on the NETCONF configuration framework, may further include: when a network configuration access request of the network device is received from a user, it may determine whether the NMS is the local network management system of the network device based on the mapping, if yes, directly perform the network configuration access to the network device, otherwise, forward the network configuration access to the local network management system of the network device for performing the network configuration access to the network device From the above described examples, it is clear that the present disclosure may be implemented by software plus a necessary general hardware platform. That is, the machine-readable instructions execute on a general hardware platform. Certainly, it may also implemented by hardware. Based on this understanding, the technology of the present disclose may be embodied in the form of a software product. The computer software product is stored in a storage medium, and the computer software product includes a number of instructions to make an end device (may be a mobile phone, a personal computer, a server, or network equipment, etc.) to execute the method according to the examples of the present disclosure.

The above are the preferred examples of the present disclosure is not intended to limit the spirit and principles of the present disclosure, any changes made, equivalent replacement, or improvement in the protection of the present disclosure should contain within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are the illustrations of an example, wherein the units or procedure shown in the figures are not necessarily essential for implementing the present disclosure. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or block, or group of elements, integers or steps, but not the exclusion of any other element, integer or block, or group of elements, integers or blocks.

Numerous variations and/or modifications may be made to the above-described embodiments, without departing from the broad general scope of the present disclosure. The present embodiments are, therefore, to be considered in all respects as illustrative and not restrictive.

The invention claimed is:

1. A method for network configuration access, including:
a network device joining a network management system (NMS);
searching, by the network management system (NMS) according to a type information of the network device, for a transport layer protocol which is supported by the network device in a transport layer architecture of a network configuration protocol (NETCONF) configuration framework of the NMS and definition information which the transport layer protocol is to use to implement a connection to the network device;
establishing a NETCONF session with the network device by using said transport layer protocol and said definition information;
during establishment of the NETCONF session, comparing a first NETCONF capability set which is obtained from the network device with a second NETCONF capability set that is supported by the NMS and is defined in a metadata definition file of the NETCONF configuration framework, and assigning an intersection of the first NETCONF capability set and the second NETCONF capability set, as an active capability set of the NETCONF session; and
performing, by the NMS, a network configuration access to the network device based on the active capability set of the NETCONF session.

2. The method according to claim 1, further comprising:
searching a protocol abstract architecture of the NETCONF configuration framework to find an interface according to an operation name of the network configuration access, creating an operation instance in the interface according to the active capability set of the NETCONF session and a combination of operation information of the network device in which the operation information is defined in the metadata definition file of the NETCONF configuration framework, encapsulating the operation instance to a query instance, setting up attributes of the operation instance of the query instance, generating NETCONF configuration contents according to the query instance, and performing a configuration access to the network device by using the established NETCONF session.

3. The method according to claim 1, further comprising:
defining a type, a capability set, and an operation information of the network device, according to a metadata definition specification of a pre-defined NETCONF configuration framework, in the metadata definition file of the NETCONF configuration framework; defining an operation element and an operation parameter element of the network device, according to a protocol abstract architecture of the NETCONF configuration framework, wherein the protocol abstract architecture defines a corresponding interface and an implementation of a NETCONF protocol layer hierarchy in the NETCONF configuration framework; and defining, according to the transport layer architecture of a pre-defined NETCONF configuration frame, the transport layer protocol supported by the network device and the connection to the network device in which the connection adapts the corresponding transport layer protocol.

4. The method according to claim 1, further comprising:
extending, by the NMS, a type information, a capability set, and an operation information supported by the network device, according to a metadata definition specification of a pre-defined NETCONF configuration framework, in the metadata definition file;
extending an operation element and an operation parameter element of the network device according to a protocol abstract architecture of the pre-defined NETCONF configuration framework; or
extending, according to the transport layer architecture of a pre-defined NETCONF configuration frame, the transport layer protocol supported by the network device and definition of the connection to the network device in which the connection use the corresponding transport layer protocol.

5. The method of claim 1, further comprising:
saving, by the NMS, a mapping between the network device and the NMS in a local area network in which the NMS is located in the local area network; and
the network configuration access by the NMS to the network device based on the NETCONF configuration framework further comprising:
receiving a network configuration access request of the network device from a user, determining whether the NMS is a local network management system of the network device based on the mapping, wherein if the NMS is determined to be the local network management system of the network device, directly performing the network configuration access to the network device, wherein if the NMS is determined not to be the local network management system of the network device, forwarding the network configuration access to the local network management system of the network device for performing the network configuration access to the network device.

6. A non-transitory computer readable storage medium on which is stored machine readable instructions that when executed by a processor cause the processor to:
search, according to type information of a network device, for a corresponding transport layer protocol which is supported by the network device in a transport layer architecture of a network configuration protocol (NETCONF) configuration framework and definition information which is used by the transport layer protocol to implement a connection to the network device, and establish a NETCONF session to the network device by using transport layer protocol supported by the network device and corresponding definition information which is used by the transport layer protocol supported by the network device to implement a connection to the network device;
compare a first NETCONF capability set which is obtained from the network device with a second NETCONF capability set which is supported by a network management system (NMS) and is defined in a metadata definition file of the NETCONF configuration framework during the establishment of the NETCONF session, and assign an intersection of the two capability sets as an active capability set of the NETCONF session; and
perform a network configuration access to the network device based on the active capability set of the NETCONF session.

7. The non-transitory computer readable storage medium according to claim 6, wherein the machine readable instructions are further to cause the processor to:
search, according to an operation name of the network configuration access, a protocol abstract architecture of the NETCONF configuration framework to find an interface, create an operation instance in the interface according to the active capability set of the NETCONF session and a combination of operation information of the network device in which the operation information is defined in the metadata definition file of the NETCONF configuration framework, encapsulate the operation instance to a query instance, set up attributes of the operation instance of the query instance, generate NETCONF configuration contents according to the query instance, and perform a configuration access to the network device by using the established NETCONF session.

8. The non-transitory computer readable storage medium according to claim 6, wherein the machine readable instructions are further to cause the processor to:
define a type, a capability set, and an operation information of the network device according to a metadata definition specification of a pre-defined NETCONF configuration framework in the metadata definition file of the NETCONF configuration framework;
define an operation element and an operation parameter element of the network device according to a protocol abstract architecture of the NETCONF configuration framework, wherein the protocol abstract architecture defines a corresponding interface and an implementation of a NETCONF protocol layer hierarchy in the NETCONF configuration framework; and
define, according to the transport layer architecture of a pre-defined NETCONF configuration frame, the transport layer protocol supported by the network device and the connection to the network device in which is adapted by the corresponding transport layer protocol.

9. The non-transitory computer readable storage medium according to claim 6, wherein the machine readable instructions are further to cause the processor to:
- extend a type information, a capability set, and an operation information supported by the network device, according to a metadata definition specification of a pre-defined NETCONF configuration framework, in the metadata definition file;
- extend an operation element and an operation parameter element of the network device according to a protocol abstract architecture of the pre-defined NETCONF configuration framework; or
- extend, according to the transport layer architecture of a pre-defined NETCONF configuration frame, the transport layer protocol supported by the network device and definition of the connection to the network device in which the connection uses the corresponding transport layer protocol.

10. The non-transitory computer readable storage medium according to claim 6, wherein the machine readable instructions are further to cause the processor to:
- save a mapping between the network device and the NMS of a local area network in which the NMS is located in the local area network; and
- receive a network configuration access request of the network device from a user, determine whether the NMS is a local network management system of the network device based on the mapping, wherein if the NMS is determined to be the local network management system of the network device, directly perform the network configuration access to the network device, wherein if the NMS is determined not to be the local network management system of the network device, forward the network configuration access to the local network management system of the network device for performing the network configuration access to the network device.

* * * * *